US006291796B1

(12) United States Patent
Lu et al.

(10) Patent No.: US 6,291,796 B1
(45) Date of Patent: Sep. 18, 2001

(54) APPARATUS FOR CFC-FREE LASER SURFACE CLEANING

(75) Inventors: YongFeng Lu, Singapore (SG); Yoshinobu Aoyagi, Saitama (JP)

(73) Assignee: National University of Singapore, Singapore (SG)

(*) Notice: Subject to any disclaimer, the term of this patent is extended or adjusted under 35 U.S.C. 154(b) by 0 days.

This patent is subject to a terminal disclaimer.

(21) Appl. No.: 08/434,175

(22) Filed: May 1, 1995

Related U.S. Application Data

(63) Continuation of application No. 08/323,555, filed on Oct. 17, 1994, now abandoned.
(51) Int. Cl.⁷ .................................................. B23K 26/00
(52) U.S. Cl. ............................................................ 219/121.68
(58) Field of Search ............................ 219/121.6, 121.68, 219/121.69, 121.73; 134/1

(56) References Cited

U.S. PATENT DOCUMENTS

| | | | |
|---|---|---|---|
| 4,729,372 | * | 3/1988 | L'Esperance, Jr. ............. 219/121.73 |
| 4,733,944 | * | 3/1988 | Fahlen et al. . | |
| 5,151,135 | * | 9/1992 | Magee et al. ............................. 134/1 |
| 5,482,561 | * | 1/1996 | Yeung et al. ...................... 219/121.6 |
| 5,669,979 | * | 9/1997 | Elliot et al. ................................ 134/1 |

FOREIGN PATENT DOCUMENTS

| | | | |
|---|---|---|---|
| 233755 | * | 8/1987 | (EP) . |
| 2258182 | * | 2/1992 | (GB) . |
| 3-81082 | * | 4/1991 | (JP) . |

OTHER PUBLICATIONS

"Laser–Cleaning Techniques for Removal of Surface Particulates" by Tam et al., J. Appl. Physics 71 (7), Apr. 1, 1992, pp. 3515–3523.*

* cited by examiner

Primary Examiner—Geoffrey S. Evans
(74) Attorney, Agent, or Firm—Kenyon & Kenyon

(57) ABSTRACT

An apparatus for dry cleaning a surface includes a laser generator, a laser beam homogenizer, an aperture and a lens that are controlled by a CPU. The laser is preferably a KrF excimer laser although any laser capable of generating a pulsed output in the ultraviolet spectrum may be used. The lens is preferably a plano-convex lens. Articles to be cleaned are placed on a conveyor that transports the article through the laser beam. The CPU can store parameters for optimizing removal of a particular contaminant. These parameters may include the frequency of the pulse beam generated by the laser, the shape of the aperture, the position of the lens is controlled by a stage, and the speed of the conveyor belt.

2 Claims, 4 Drawing Sheets

APPARATUS FOR CFC-FREE LASER SURFACE CLEANING

This application is a proper file wrapper continuing (FWC) application of Ser No. 08/323,555, filed Oct. 17, 1994, now abandoned.

FIELD OF INVENTION

The present invention relates to a method of drycleaning surfaces for the removal of surface organic contaminants and to the apparatus for carrying out this cleaning process. More specifically, the present invention relates to a method of cleaning surfaces, such as semiconductors, metals and ceramics, through the use of pulsed, short wavelength laser irradiation and to the apparatus for carrying out this cleaning process.

BACKGROUND OF THE INVENTION

Traditionally, surface contaminants such as oil, grease and other organic and inorganic compounds are removed from substrate surfaces such as semiconductors, metals, ceramics, magnetic materials, plastics and optical device surfaces, by wet cleaning processes. These wet cleaning processes conventionally comprise placing the object to be cleaned into an organic solvent such as carbon fluorochloride and trichloroethylene and vibrating it by subjecting it to ultrasonic waves. The chemical action of the solvent, in combination with the physical action of the ultrasonic waves, achieves the cleaning of the substrate surface.

This wet cleaning method effectively removes most organic contaminants, however, there are several undesirable aspects of this cleaning process which the present invention avoids. Organic solvents such as trichloroethylene and carbon fluorochloride are hazardous to human health and their use entails a health risk to workers handling them. Particularly, when applying ultrasonic waves to an organic solvent bath, there is a heightened health risk resulting from the vaporization of the solvents. Furthermore, the exposure of workers to the noise generated by ultrasonic wave machines presents an independent health hazard. One that may have long term consequences. Additionally, the use of these organic solvents also pose a risk to the environment. Carbon Fluorochloride has been implicated in the depletion of the Earth's ozone layer and leakage of these solvents into the environment may cause serious pollution and damage. Disposal of waste solvents presents yet another difficulty encountered when using this organic solvent cleaning method.

Apart from the obvious health and environmental concerns involved with these wet-cleaning processes, there are difficulties inherent in their application. The process is inefficient and costly, requiring several steps to exchange the cleaning solvents and exchange of substrates. This makes the process not feasible for some applications.

More importantly, these ultrasonic cleaning processes have difficulties cleaning surfaces of substrates which react chemically with the cleaning solvents. Where the reaction of the substrate to the solvent is strong, this method of cleaning may be unacceptable.

Finally, these cleaning processes are limited in that they cannot clean the surface of articles which are larger than the ultrasonic cleaning basin.

In an effort to avoid the inherent disadvantages of ultrasonic solvent cleaning methods, other cleaning methods utilizing lasers have been developed. Laser cleaning by annealing or melting require high energy lasing as well as costly operating conditions. These cleaning methods often require that the work be done within a vacuum chamber in order to remove the contaminants released from the surface. Utilizing a vacuum chamber is costly and time consuming. It may also restrict the size of the work-piece to be cleaned.

Additionally, cleaning by annealing and by melting reconfigures the physical structure of the surface of the structure to be cleaned. This is undesirable when the integrity of the surface to be cleaned must be maintained.

Other laser cleaning methods employ a method of saturating the surface being cleaned with an inert gas. Such operations require methods of flowing a gas over the work surface which in turn requires a containment vessel for the work-piece and a means to circulate the gas over the work surface. This presents the obvious disadvantage of cost and time consumption.

SUMMARY OF THE INVENTION

The present invention provides an effective method to clean substrate surfaces without organic solvents or ultrasonic baths while also avoiding the drawbacks often associated with most laser cleaning methods. The cleaning method of this invention is a dry process which utilizes controlled laser energy to clean substrates surfaces. This method is feasible and effective for a variety of applications.

The present invention also provides an apparatus for dry cleaning contaminated substrate surfaces with pulsed, short wavelength laser irradiation in an ambient air environment. The apparatus is comprised a short wave langth laser, such as an excimer laser, which provides the laser irradiation for the dry cleaning, a conveyor belt mechanism which delivers the object to be cleaned to the cleaning area and a computer which controls the cleaning process. A beam homogenizer in conjunction with an electronically controlled aperture and quartz lens focus and control the intensity of the laser beam. Additionally, a mirror directs the laser beam onto the substrate to be cleaned. An energy meter monitors the total energy of the pulse beam, either prior to directing the bean onto the substrate or while the beam is being directed onto the substrate by use of a beam splitter.

The present invention also has the advantage of allowing real-time in-situ monitoring of the cleaning process.

DETAILED DESCRIPTION OF THE PREFERRED EMBODIMENT

Figure 1:
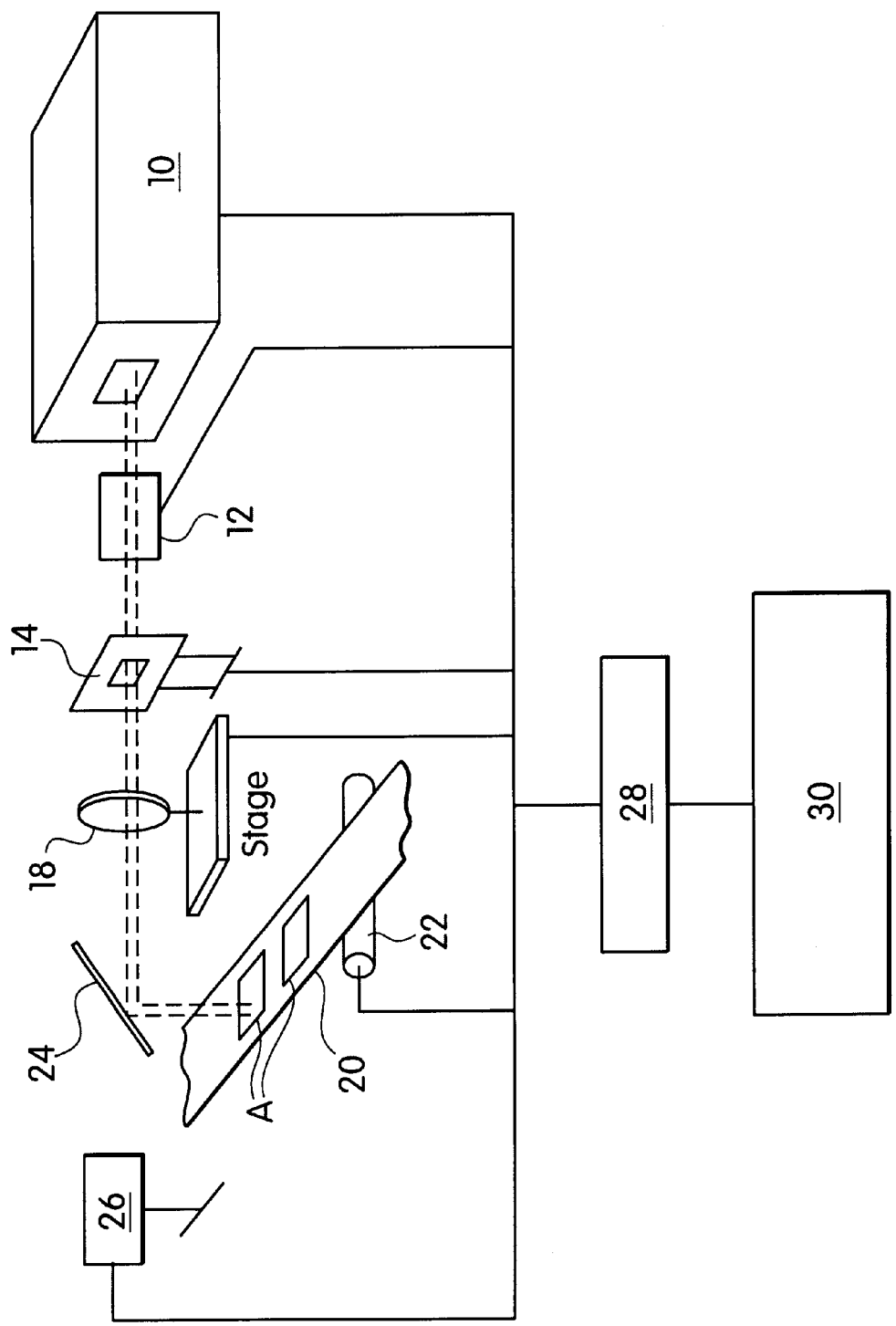
FIG. 1 illustrates the schematic diagram of the cleaning device.

Referring to FIG. 1, There is shown the laser dry-cleaning device of the invention. A laser 10 generates a pulsed, short wavelength laser beam which is is directed onto the surface of the article to be cleaned which is transported through the laser beam on conveyor belt 20. Laser 10 is preferably an KrF excimer laser. However, it is understood that any laser capable of generating a pulsed output in the ultraviolet spectrum may be used. The pulsed short wavelength laser beam from laser 10 is controlled and focused prior to being directed onto the article to be cleaned. The laser beam passes through a beam homogenizer 12 which dives the beam a flat intensity profile, i.e. the beam intensity is uniform across the beam face. After passing through the beam homogenizer 12, the laser beam passes through an electrically and automatically controlled aperture 14 which can modify the size and shape of the pulsed laser beam. The aperture may be used to eliminate the edge of the laser beam. This is useful because the beam intensity tends to drop at the edges of the beam cross section. After passing through aperture 14, the laser beam passes through a lens 18 which is mounted on a movable electric stage 16 by which the lens 18 may be moved to focus or defocus the laser beam thereby decreasing or increasing the laser beam coverage area which in turn adjusts the laser beam intensity. Lens 18 is preferably a plano-convex lens.

Articles to be cleaned are placed on conveyor belt 20 which passes near the laser 10. After passing through lens 18 the laser beam is directed onto the article to be cleaned by a mirror arrangement 24. The speed with which the conveyor belt 20 transports the article to be cleaned through the laser beam can be adjusted by a conveyor belt speed controller 22. The pulse laser beam size and intensity at the surface of the article to be cleaned may be adjusted by changing the size of the aperture 14 or changing the focus of the beam by moving the electric stage 16 thereby moving the lens 18. The total energy of the pulse laser beam can be measured by a laser energy meter 26. The energy meter 26 may be arranged to calibrate the beam energy before the laser beam is directed onto the substance to be cleaned. This can be accomplished by aligning the energy meter 26 such that by moving mirror arrangement 24 out of the way, the laser beam will strike energy meter 26. An alternative technique for measuring laser beam energy in real time utilizes a beam splitter. The laser beam passes through beam splitter. The beam splitter will split the laser beam, directing one beam into energy meter 26 and one beam onto mirror arrangement 24 which will be directed onto the object to be cleaned. This arrangement allows for real time monitoring of laser beam energy.

A means is provided for controlling the laser generator, the laser beam homogenizer, the aperture, the lens and the means for moving an article through the laser beam. In a preferred embodiment the laser 10, aperture 14, electric stage 16, conveyor belt controller 22, mirror arrangement 24 homogenizer 12, and energy meter 26 are all controlled through an interface 28 to a central computer 30.

The parameters for properly cleaning a particular substance or the parameters for optimizing the removal of a particular contaminant can be stored in computer 30. These parameters may include the frequency of the pulse beam generated by laser 10, the shape of aperture 14, the position of lens 16 as controlled by stage 16, and the speed of conveyor belt 20. For each contaminant and for each surface substance there are parameters which will allow the efficient and complete cleaning of the articles surface. These parameters depend upon the composition of the work-piece being cleaned and the composition of the contaminant. The heats of formation of the work-piece and the contaminants are parameters that must be considered. The heats of formation for various materials are well known and are reported in the CRC Handbook of Chemistry and Physics, Cleveland, Ohio: CRC Press 1977, which is hereby incorporated by reference.

The system of this invention is intended to operate in a normal atmospheric environment thereby eliminating the need for cleaning solutions, a vacuum chamber, or a specialized gas environment. When operating, the system of this invention removes surface contaminants by laser induced photo-decomposition, laser ablation and surface vibration by the impact of the laser pulse.

The effect of ambient oxygen and carbon on the surfaces being treated with the system of this invention is minimal. The short duration of the laser pulses limits the amount of molecular interactions that can occur at the impact point minimizing the likelihood of a reaction occurring during the ablation process. The molecular movement in air at room temperature is estimated to be under 0.1 micron within a 20 ns time interval. Additionally, there is a shock wave effect radiating away from the laser impact point, carrying away residue from the laser pulse, reducing the probability of a molecule reacting with the substrate surface during treatment.

An additional advantage of this laser dry-cleaning system is the use of real-time in-situ monitoring of the cleaning process. The system of this invention may employ numerous methods of monitoring the progress of the cleaning process as well as assessing the final product.

One method of real-time in-situ monitoring employs a charge-coupled-device (CCD) camera. An image of the work-piece being cleaned can be sent from the CCD camera to a computer for image processing. Comparison of the CCD image with a standardized image of a clean work-piece allows the computer to monitor and control the cleaning process.

Another real-time in-situ method of monitoring the cleaning process employs a semiconductor laser to measure surface reflectivity. A semiconductor laser is directed onto the substrate surface during the cleaning process. A photo-detector detects the power of the reflected beam. The surface reflectivity is dependent on the level of surface contamination. By comparing the level of reflectivity of the work-piece with the standard reflectivity of a clean work-piece of the same composition, the level of surface cleanliness can be determined and the cleaning process can be tailored to yield the most beneficial result.

It is recognized that a variety of lasers may be used in the system of this invention. Among the lasers readily available that are suitable for this use in addition to the KrF excimer laser are: XeCl excimer laser, ArF excimer laser, solid state lasers and semiconductor lasers. Essentially any laser capable of producing a pulsed beam with a short wavelength under 400 nm may be used in this invention.

EXAMPLES

Example 1

Figure 2A:
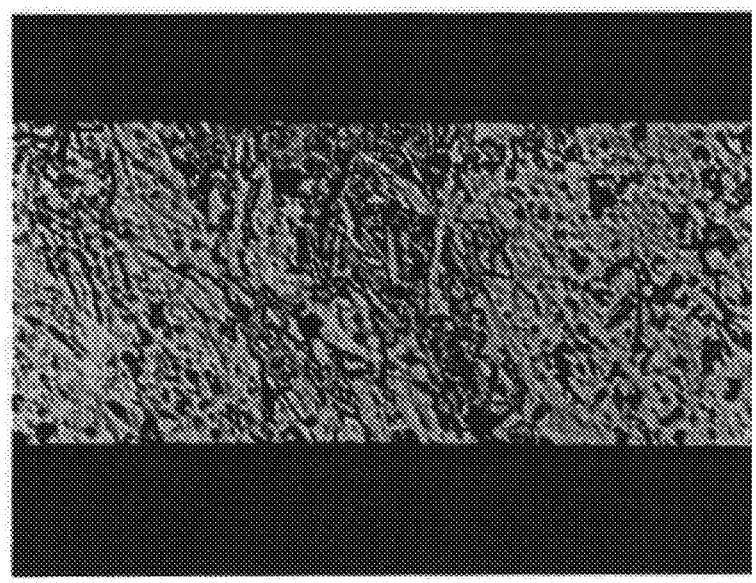
FIG. 2a is a magnified optical microscope image of a magnetic head slider surface contaminated with an epoxy resin film before cleaning.

FIG. 2a shows a slider surface of a ferrite magnetic head contaminated with an epoxy resin film several micrometers thick. The slider head was cleaned by the system of this invention. A portion of the contaminated surface was irradiated by a KrF excimer laser (Lambda Physik LPX 100)

with a wavelength of 248 nm and an intensity of 60 mJ/cm$^2$. The surface was subjected to 2500 pulses.

Figure 2B:
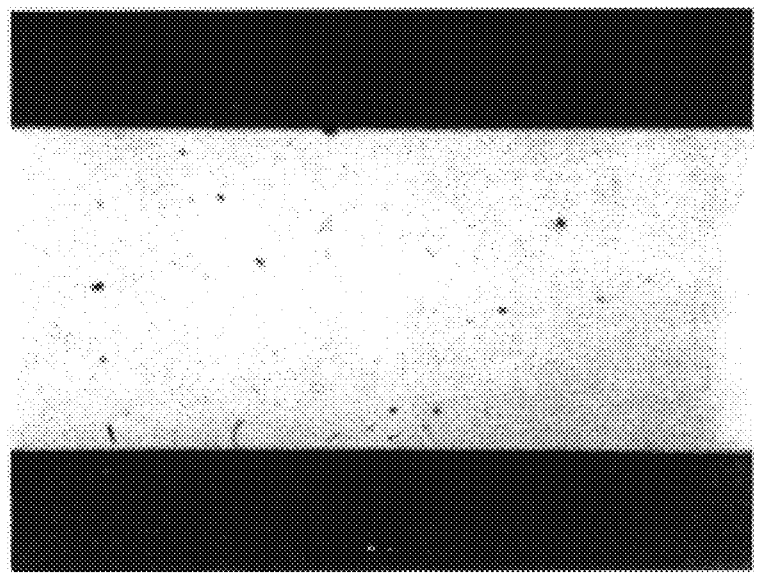
FIG. 2b is a magnified optical microscope image of the magnetic head slider surface of FIG. 2a, after cleaning with the process of this invention.

FIG. 2b shows the slider surface of FIG. 2a after cleaning. The treated surface area in FIG. 2b was verified to be completely cleaned by the laser dry-cleaning process by AES (Auger electron spectroscopy) measurements. The estimated increase in the temperature of the substrate being cleaned when subjected to a beam with an intensity of 60 mJ/cm$^2$ is very low thereby limiting any potential thermal damage.

FIG. 2a represents a case of extreme contamination. General surface contamination, envisioned to be in the order of nanometers, may be cleaned with as few as 10 pulses.

Example 2

Figure 3A:
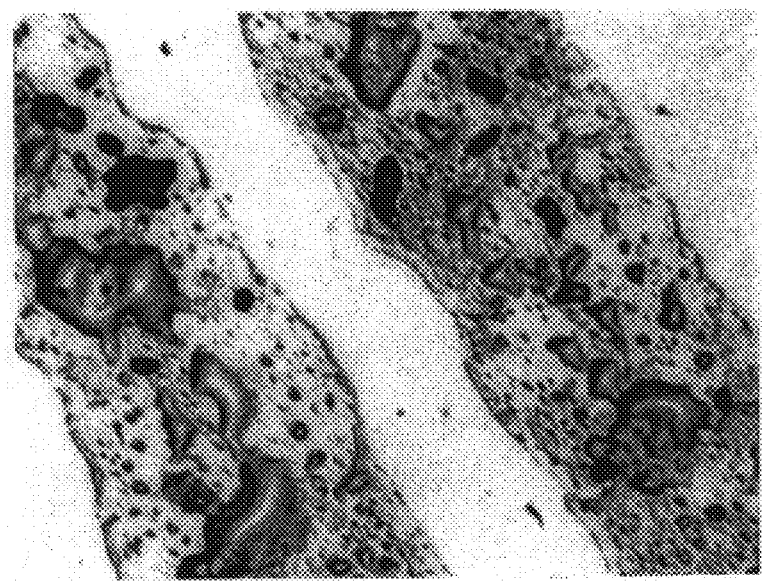
FIG. 3a is a magnified optical microscope image of a glass surface contaminated with fingerprints.

FIG. 3a shows an optical microscope photograph of a glass slide surface contaminated with fingerprints. The glass slide was cleaned by the system of this invention. A portion of the contaminated surface was irradiated by a KrF excimer laser with an intensity of 500 mJ/cm$^2$. The surface was subjected to a single pulse which completely cleaned the slide.

Figure 3B:
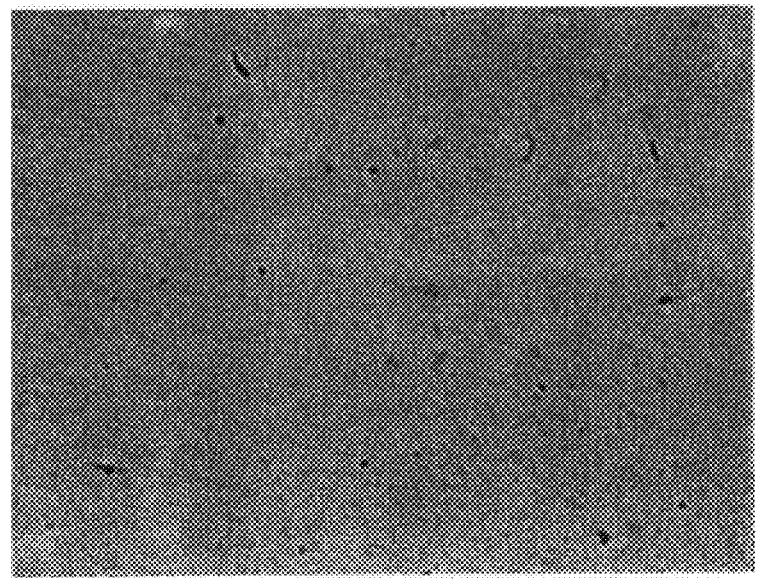
FIG. 3b is a magnified optical microscope image of the glass surface of FIG. 3a, after cleaning with the process of this invention.

FIG. 3b shows the slider surface of FIG. 3a after cleaning. An Electron Probe for Material Analysis (EPMA) measurement indicates that fingerprints contain inorganic components such as K, Na, Cl and Ca in addition to the organic components. This complex contamination is completely cleaned by the single laser pulse.

In contrast to example 1, it is shown that by increasing the power intensity of the laser beam the pulse number can be reduced. By selecting a power intensity just below the damage threshold of the substrate to be cleaned, a minimum number of pulses need be applied. This increases the efficiency of the cleaning process when a high power excimer laser is used.

Example 3

Figure 4:
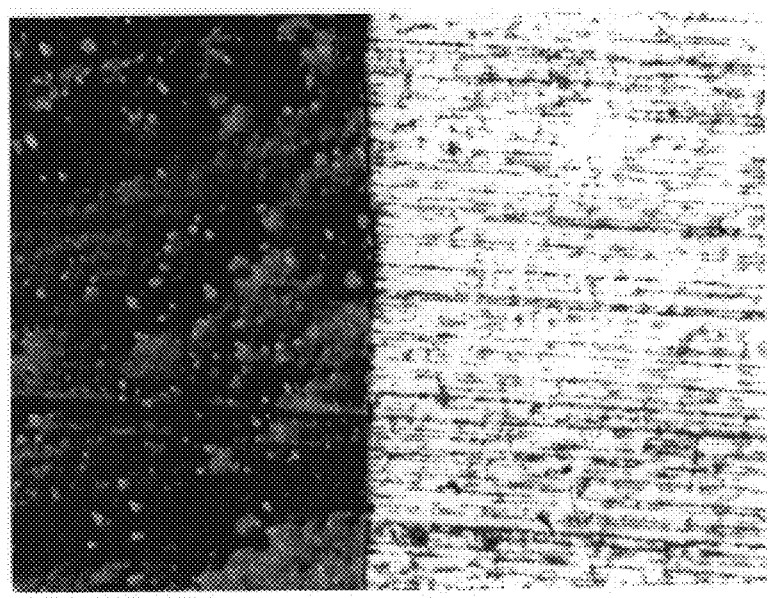
FIG. 4 is a magnified optical microscope image of a copper substrate painted by felt tip marker and partially cleaned by the process of this invention.

FIG. 4 shows the surface of a copper plate contaminated with a felt tip pen. The copper plate was cleaned by the system of this invention. A portion of the contaminated surface was irradiated by a KrF excimer laser with an intensity of 500 mJ/cm$^2$. The surface was subjected to 20 pulses.

FIG. 4 shows the copper plate after cleaning. The treated surface area in FIG. 4 was verified to be completely cleaned by the laser dry-cleaning process by AES (Auger electron spectroscopy) measurements as well as optical microscopic observation.

Example 4

Figure 5:
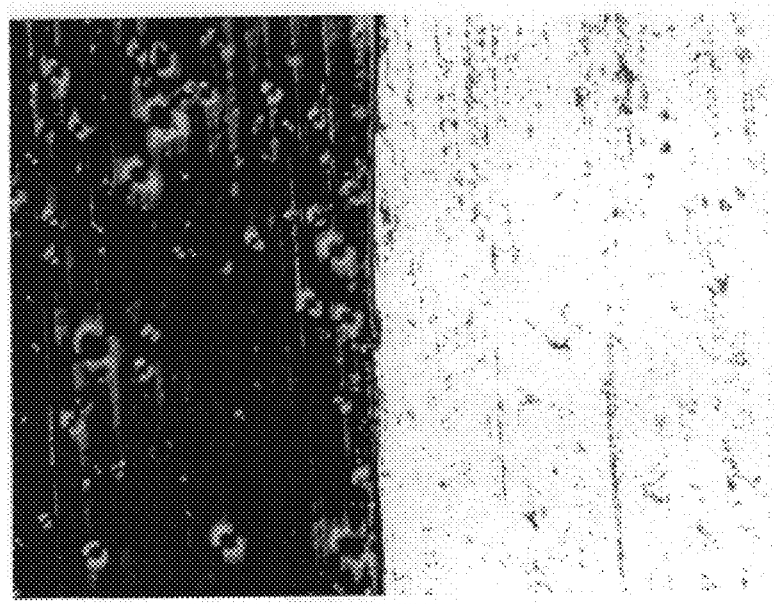
FIG. 5 is a magnified optical microscope image of a stainless steel substrate painted by felt tip marker and partially cleaned by the process of this invention.

FIG. 5 shows the surface of a stainless steel plate contaminated with a felt tip pen. The stainless steel plate was cleaned by the system of this invention. A portion of the contaminated surface was irradiated by a KrF excimer laser with an intensity of 500 mJ/cm$^2$. The surface was subjected to 20 pulses.

FIG. 5 also shows the copper plate after a portion has been cleaned. The treated surface area in FIG. 5 was verified to be completely cleaned by the laser dry-cleaning process by AES (Auger electron spectroscopy) measurements as well as optical microscopic observation.

What is claimed is:

1. A laser dry cleaning device comprising:
   (a) a laser generator;
   (b) a laser beam homogenizer oriented such that a laser beam transmitted from said laser generator may pass through said homogenizer;
   (c) an aperture oriented such that said laser beam passing through said laser beam homogenizer may pass through said aperture;
   (d) a lens oriented such that said laser beam passing through said aperture may pass through said lens;
   (e) a means of moving an article to be cleaned through said laser beam after said laser beam passes through said lens; and
   (f) a means for controlling said laser generator, said laser beam homogenizer, said aperture, said lens and said means for moving an article through said laser beam.

2. The laser dry-cleaning device of claim 1 wherein said laser generator is an excimer laser.

* * * * *